Patented Feb. 24, 1948

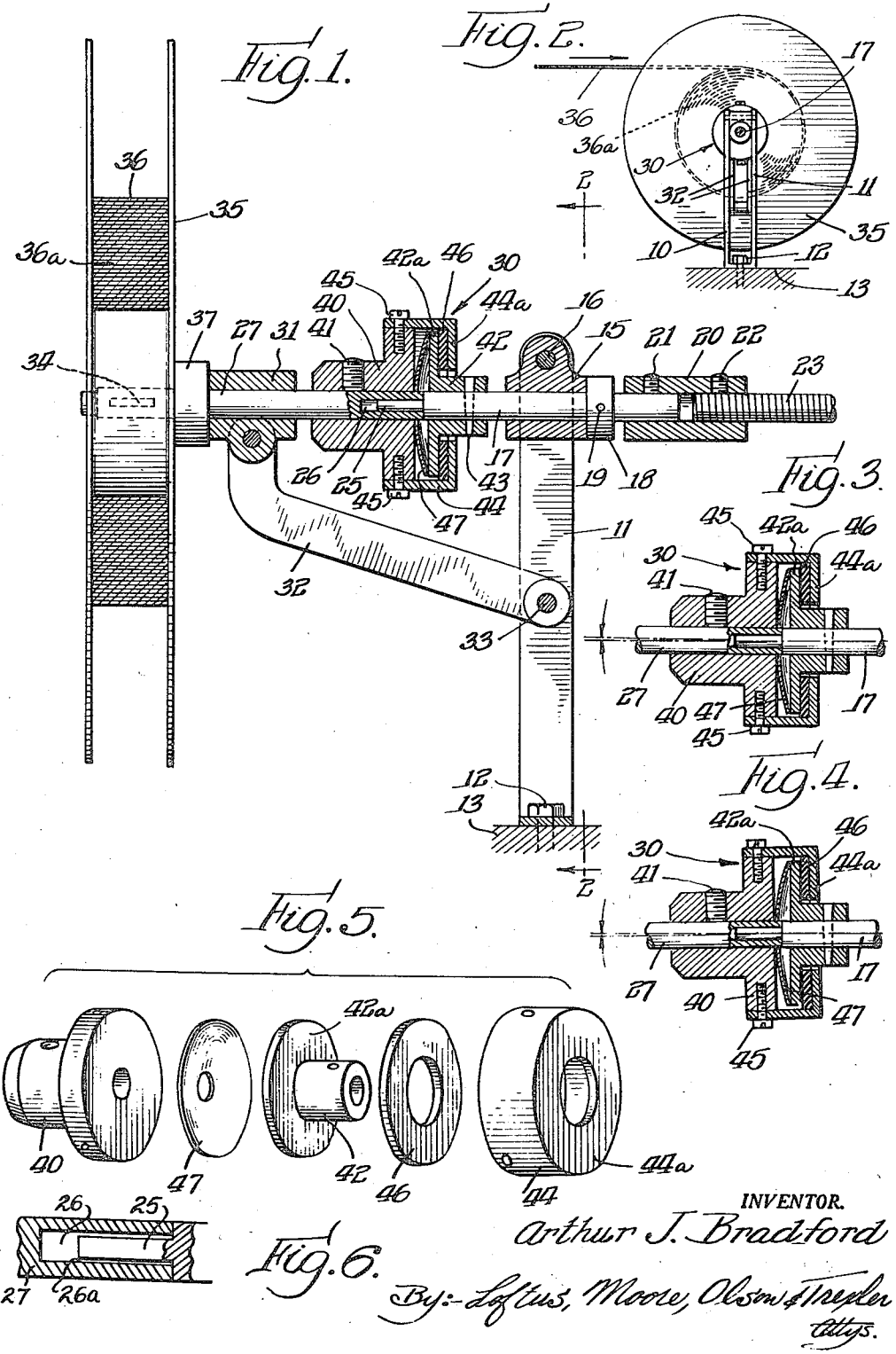

2,436,418

UNITED STATES PATENT OFFICE 2,436,418

WINDING MECHANISM

Arthur J. Bradford, Chicago, Ill., assignor, by mesne assignments, to Motion Picture Engineering Corporation, a corporation of Illinois Application September 23, 1943, Serial No. 503,464

16 Claims. (Cl. 242—55)

This invention relates to winding mechanisms, particularly of the type adapted to receive and accumulate an elongated length or strip of material to be wound, and wherein means is provided for maintaining a predetermined and controlled tension in the length or strip of material during the winding operation.

It is an object of the invention to provide a winding mechanism of the type stated, of improved construction and operating characteristics.

More specifically, it is an object of the invention to provide a winding mechanism of the type defined, which is of simplified construction, and may be readily fabricated and assembled; and which effects an improved, more sensitive, and more accurate and predetermined control of the tension in the length or strip of material being wound.

Various other objects, advantages and features of the invention will be apparent from the following specification when taken in connection with the accompanying drawings, wherein a preferred embodiment of the invention is set forth for purposes of illustration.

In the drawings, wherein like reference numerals refer to like parts throughout:

Fig. 1 is a general assembly view, in longitudinal section, of a winding mechanism constructed in accordance with and embodying the principles of the invention;

Fig. 2 is a transverse sectional view, on a reduced scale, of the mechanism of Fig. 1, and taken as indicated by the line 2—2 thereof;

Fig. 3 is a detail view of the friction clutch or drive mechanism forming a part of the structure;

Fig. 4 is a view similar to Fig. 3, but showing the clutch in a different operating position; and Fig. 5 is an exploded view of the various elements forming a part of the clutch structure.

Fig. 6 is an enlarged and greatly magnified sectional view showing the connection between the shafts.

In the drawings the invention has been shown for purposes of illustration as embodied in a winding device or mechanism of the type adapted for winding film strip or the like, such for example as used with motion picture projectors. Certain features of the invention are particularly adapted for use with apparatus of this type. It is to be understood however that the invention in various of its features and aspects may also be adapted for use with other types of winding mechanisms and devices, for other uses and purposes.

Referring more particularly to the drawings, and first to Figs. 1 and 2 thereof, it will be seen that the device illustrated comprises a support or standard, in the form of a pair of spaced uprights 10 and 11, adapted to be secured by suitable means, such as a bolt 12, to a support surface 13 forming a part of the frame or structure with which the winding mechanism of the invention is to be associated.

At their upper ends, the uprights 10 and 11 support a bearing bracket 15 by means of a cross pin 16 interconnecting the bearing bracket and the ends of the uprights. This bearing bracket 15 rotatably supports a drive shaft 17, a collar 18 being pinned to the shaft, as by means of a pin 19, and having bearing engagement against the bracket 15 to limit the axial movement of the shaft, to the left as seen in Fig. 1. A coupling sleeve 20 is adapted to be secured to the end of the shaft 17 by suitable means such as a set screw 21, this coupling also being adapted to be secured by means of a set screw 22 to a drive shaft 23 adapted to be coupled with and driven from a suitable source of driving power (not shown). It will be seen that as the drive shaft 23 is rotatably driven by the source of driving power, the drive shaft 17 will be correspondingly driven, the two shafts essentially constituting a single integral shaft structure by reason of the coupling connection 20.

The shaft 17 is provided on its end remote from the coupling 20 with an extension 25 adapted to fit loosely within a socket 26 formed in the end of a driven shaft 27, which driven shaft is axially alined with the end of the drive shaft 17. A very slight clearance is provided between the extension 25 and the socket 26 and this clearance, designated as 26a, is shown on a greatly magnified scale in Fig. 6 for purposes of illustration. A clutch structure, generally indicated by the numeral 30, is provided for frictionally driving the driven shaft 27 from the drive shaft 17. The details of this clutch structure will be later described.

The driven shaft 27 is rotatably carried by a bearing bracket 31 pivotally carried at one end of a pair of support links 32, the other ends of which are pivotally mounted upon the uprights 10 and 11 by means of a pivot pin connection 33. The end of the shaft 27 has keyed or pinned thereto, by means of a key 34, a winding reel 35, which winding reel, in the particular embodiment illustrated, is of the type adapted to receive and accumulate a roll of film, tape, or strip, as for example the take-up roll of a motion picture projector. In Figs. 1 and 2 the film strip being wound is indicated by the numeral 36, the coils of the strip already accumulated upon the reel being indicated by the numeral 36a. The shaft 27 is provided with a collar 37, as an integral part of shaft 27, having a rotatable bearing engagement against the end of the bearing bracket 31, whereby to limit the movement of the driven shaft 27 axially with respect to the bearing bracket, to the right as seen in Fig. 1.

The details of the friction clutch structure 30, by means of which the drive shaft 17 is adapted to adjustably drive the driven shaft 27, are best shown in Figs. 1 and 5. As indicated, the clutch comprises a collar member 40 adapted to be secured to the end of the driven shaft 27 by means of a set screw 41, and a collar 42 adapted to be fixed to the end of the drive shaft 17 by means of a tapered pin 43. A flange piece 44 is secured to the collar 40 by means of a series of screws 45, a disc 46 of suitable friction material being interposed between the flange portion 44a of the flange piece and the flange portion 42a of the collar 42. A cup-shaped spring member 47 is interposed between the flange 42a and the collar 40, whereby a desired frictional engagement is maintained between the friction disc 46 and the engaged clutch flanges 42a and 44a. It will be seen that, depending upon the thrust or tension in the spring 47, a predetermined frictional driving engagement is maintained between the friction disc 46 and the engaged flanges 42a and 44a, whereby the drive shaft 17 effects a predetermined frictional driving action upon the driven shaft 27, as the drive shaft is rotated. Adjustment means for adjusting the tension of the spring 47 may be provided, if desired, or as shown in the specific embodiment illustrated, a spring member 47 of any desired size or strength and resiliency may be installed or substituted in the clutch structure, whereby to provide the desired degree of initial frictional engagement or driving force between the drive and the driven shafts.

In accordance with the principles of the invention, means is provided whereby the pull or winding tension upon the strip 36 may be automatically predetermined and controlled at all times during the winding operation. In the particular embodiment shown, means is provided for automatically maintaining the tension in the strip substantially constant during the entire winding operation, notwithstanding the variation in the diameter or size of the accumulated strip roll upon the reel 35. More particularly, in operation, as the size of the roll 36a builds up upon the reel 35, the weight of the roll correspondingly increases. This increase in weight causes the reel 35, as well as the associated bearing bracket 31, and the shaft 27 and associated clutch elements 40 and 44a to exhibit a tendency to shift as a unit about the pivot point 33 under control of the operating arms or links 32. In other words, the increasing weight of the reel 35 causes the reel and the associated clutch elements 40 and 44a to tend to shift downwardly and to the left as seen in Fig. 1, about the pivot point 33.

This shifting movement causes an increased frictional driving engagement to be established within the clutch 30 in a manner which will be best understood by reference to Figs. 3 and 4. In Fig. 3 the clutch elements are indicated in their normal position, for example when there is little or no weight of the film upon the winding reel. In Fig. 4 the position of the parts is illustrated as weight of the accumulated film strip builds up upon the winding reel, and it will be seen that under such conditions the clutch elements 40, 44a tend to twist and shift to the left as seen in Figs. 3 and 4, whereby to increase the frictional driving engagement between the clutch elements 42a and 44a, thus increasing the frictional driving forces between the drive shaft 17 and the driven shaft 27. It is to be understood that the actual physical shifting movements of the clutch are relatively small, and in Fig. 4 these shifting movements have been considerably exaggerated for purposes of illustration.

Accordingly it will be seen that continuously during the winding operation, as the roll of film strip builds up upon the reel 35, the frictional driving forces transmitted by the clutch structure 30 are automatically progressively increased. As the size of the roll 36a increases, the distance or torque arm between the axis of the shafts 17, 27, and the line of force of the pull on the film 36 progressively increases. The progressively increasing frictional drive provided by the clutch coacts with this progressively increasing torque arm in a manner so as to maintain a resulting substantially constant tension or pull upon the film during the entire winding operation. Accordingly the tension or pull on the film remains substantially constant, facilitating uniformity and regularity of operation of the projector apparatus or other associated mechanism.

It will be further noted that in installations wherein the strip extends substantially horizontally from the reel 35, as shown in Fig. 2, or substantially perpendicularly to the plane of operation of the links 32, any variations in the tension within the strip, if such variations should occur, do not exhibit any tendency to shift the links 32, and are accordingly not reflected in any movement or variation in the clutch parts or forces transmitted since the links and connected bearing constrain the driven shaft to movement in a predetermined plane or direction. Accordingly variations in strip tension, if such should occur, are not magnified or perpetuated within the structure. By varying the direction of the extension of the film from the reel, with respect to the plane of operation of the arms or links 32, the aforementioned characteristic of operation may be varied or controlled as desired, as will be readily understood. In other words, if a film strip were to be extended from the reel in a plane parallel to the plane of operation of links 32, variations in the strip tension would be reflected in the operation of the clutch structure.

The projection 25 of the shaft 17 is intended to fit sufficiently loosely within the socket 26 of the shaft 27, so as to permit the operation of the clutch structure in the manner heretofore set forth. As will be understood, as the diameter of the accumulated roll upon the reel 35 varies, the reel speed of rotation correspondingly varies, whereas the speed of operation of the drive shaft 23 and the associated drive shaft 17 may remain constant. Under such conditions, the slip within the clutch 30 progressively changes during the winding operations.

Attention is directed to the initial spring pressure action of the clutch 30. The spring 47 provides any predetermined initial frictional driving force, which force is progressively increased in a smooth and controlled manner as the clutch elements are tilted and shifted.

By reason of the construction provided, a simplified structure is produced which may be readily fabricated and assembled. No accurate machining operations are required, yet the structure is sensitive in operation and effects an accurate predetermined control of the strip tension, maintaining a substantially constant tension within the strip during the winding operation, in the particular embodiment disclosed.

It is obvious that various changes may be made in the specific structural embodiment set forth without departing from the spirit of the invention. The invention is accordingly not to be limited to the specific embodiment shown and described, but only as indicated in the following claims.

The invention is hereby claimed as follows:

1. A winding mechanism comprising a driving shaft adapted to be connected to a source of driving power, a driven shaft, a friction clutch connecting said driving and driven shafts, a reel mounted upon the driven shaft upon which an elongated strip of material is adapted to be wound and accumulated, a fixed bearing bracket within which the driving shaft is rotatably supported, a shiftable bearing within which the driven shaft is rotatably mounted, a fixed member, and a link pivotally connecting said fixed member and shiftable bearing, said reel and driven shaft being movable axially in response to the weight of the accumulated material upon the reel to control the action of the clutch to thereby control the strip tension during the winding operation.

2. A winding mechanism as defined in claim 1 wherein said driving and driven shafts are provided with a projection and socket engagement to maintain the general axial alinement of the shafts when the parts are in normal position but permitting slight relative tilting between said shafts.

3. A winding mechanism comprising a driving shaft, a driven shaft substantially coaxial with the driving shaft, a reel upon which material may be wound connected to the driven shaft, a clutch connecting said shafts, said clutch being of the type the effectiveness of which is varied by the shifting of the driven shaft axially relative to the driving shaft, and means including a pivoted mounting arrangement for the driven shaft and said mounting operating to constrain the said driven shaft to shift axially relative to the driving shaft as the weight of the material on the reel increases.

4. A winding mechanism comprising a driving shaft, a driven shaft substantially coaxial with the driving shaft, a reel upon which material may be wound connected to the driven shaft, a clutch connecting said shafts, said clutch being of the type the effectiveness of which is varied by the shifting of the driven shaft axially relative to the driving shaft, a link, a pivot for the link, said pivot being spaced a substantial distance below the axes of said shafts, and a bearing bracket on said driven shaft and connected to said link, said bracket operable upon pivotal movement of said link to constrain said driven shaft to move axially relative to the driving shaft as the weight of the material on the reel increases, said link serving to confine tilting movement of said bracket and said driven shaft to a single plane.

5. The combination of a driving shaft, a driven shaft substantially coaxial with the driving shaft, a reel upon which material may be wound connected to the driven shaft, a clutch connecting said shafts, said clutch being of the type whereby the effectiveness thereof is increased as the driven shaft is shifted away from the driving shaft, and a link constraining movement of said driven shaft so as to increase the effectiveness of the clutch as the weight of the material on the reel increases.

6. The combination of a driving shaft, a driven shaft substantially coaxial with the driving shaft, a reel upon which material may be wound connected to the driven shaft, a clutch connecting said shafts, said clutch being of the type whereby the effectiveness thereof is increased as the driven shaft is shifted away from the driving shaft, a bearing bracket on the driven shaft, and a link constraining the bearing bracket and driven shaft to move increasingly away from the driving shaft so as to increase the effectiveness of the clutch as the weight of the material on the reel increases.

7. The combination of a driving shaft, a driven shaft substantially coaxial with the driving shaft, a reel upon which material may be wound connected to the driven shaft, a clutch connecting said shafts, said clutch being of the type whereby the effectiveness thereof is increased as the driven shaft is shifted away from the driving shaft, a bearing bracket on the driven shaft, and a link constraining the bearing bracket and driven shaft to move increasingly away from the driving shaft so as to increase the effectiveness of the clutch as the weight of the material on the reel increases, and a fixed pivot support for the link.

8. The combination of a driving shaft, a driven shaft substantially coaxial with the driving shaft, a reel upon which material may be wound connected to the driven shaft, a clutch connecting said shafts, said clutch being of the type whereby the effectiveness thereof is increased as the driven shaft is shifted away from the driving shaft, a bearing bracket on the driven shaft, and a link constraining the bearing bracket and driven shaft to move increasingly away from the driving shaft so as to increase the effectiveness of the clutch as the weight of the material on the reel increases, and a fixed pivot support for the link, the fixed support for the link being positioned a sufficient distance below the shaft so that the link extends upwardly and outwardly from the fixed support to the bearing bracket.

9. A winding apparatus comprising a frame, a drive shaft extending therefrom, an arm pivoted on said frame about an axis at right angles to the axis of said drive shaft, said arm extending outwardly from said frame and having bearing means thereon whose axis is substantially co-axial with the axis of said drive shaft, a driven shaft mounted in said bearing means, a friction clutch interposed between the inner end of the driven shaft and the outer end of the drive shaft, and a reel coupled to said driven shaft at the outer end of the arm, whereby the increasing weight of material being wound on said reel increases the pressure in the friction clutch as winding proceeds.

10. A winding mechanism comprising a driving shaft adapted to be connected to a source of driving power, a driven shaft substantially coaxial with said driving shaft and mounted for limited tilting and axial movement with respect thereto, clutch means connecting said shafts, a reel connected to said driven shaft and upon which an elongated strip of material is adapted to be wound, and means constraining said driven shaft to shift axially and tilt in a predetermined direction under influence of the varying effective weight of the reel with resultant control of said clutch means whereby to control the strip tension during reeling operations.

11. A winding mechanism comprising a support, a driving shaft adapted to be connected to a source of driving power, a driven shaft disposed substantially coaxial and in endwise adjacency with respect to said driving shaft and mounted for limited tilting and axial movements with respect thereto, clutch means connecting said shafts, a reel connected to said driven shaft and upon which an elongated strip of material is adapted to be wound, and means shiftable in response to tilting of said driven shaft under the influence of the varying effective weight of the reel and constraining the said driven shaft to limited and substantially uni-planar axial and tilting movements with resultant control of said clutch means whereby to control the strip tension during reeling operations.

12. A winding mechanism comprising a support, a driving shaft adapted to be connected to a source of driving power, a driven shaft disposed substantially coaxial and in endwise adjacency with respect to said driving shaft and mounted for limited tilting and axial movements with respect thereto, clutch means connecting said shafts, a reel connected to said driven shaft and upon which an elongated strip of material is adapted to be wound, shiftable bearing means within which said driven shaft rotates, and shiftable means connecting said support and said bearing means and effective to constrain said bearing means and said driven shaft to tilt in a predetermined direction and to shift axially with resultant control of said clutch means whereby to control the strip tension during reeling operations.

13. A winding mechanism comprising a driving shaft adapted to be connected to source of driving power, a driven shaft substantially coaxial with the driving shaft, a clutch connecting the driving and driven shafts, a reel connected to said driven shaft and upon which an elongated strip of material is adapted to be wound, a bearing bracket for the driven shaft, a link and a support for said link, said link operatively connecting said bracket and support and responsive to the weight of the accumulated material upon the reel to constrain the driven shaft to move axially relative to the driving shaft to vary the effectiveness of said clutch.

14. A winding mechanism comprising a driving member adapted to be connected to a source of driving power, a driven member, a clutch connecting said driving and driven members, a reel connected to said driven member and upon which an elongated strip of material is adapted to be wound, and means including a pivoted arm responsive to the weight of the accumulated material upon the reel and operating to constrain the driven shaft to move axially relative to the driving shaft to vary the effectiveness of said clutch.

15. A winding mechanism comprising a driving shaft adapted to be connected to a source of driving power, a driven shaft substantially coaxial with said driving shaft, a clutch connecting said driving and driven shafts, a spring associated with said clutch for applying a predetermined initial driving force between said shafts, a reel connected to said driven shaft and upon which an elongated strip of material is adapted to be wound and accumulated, and means operable as the weight on the reel is varied to constrain said driven shaft to tilt in a predetermined direction and move axially with respect to said driving shaft whereby to vary the effectiveness of said clutch during reeling operations.

16. A winding mechanism as claimed in claim 15, wherein said driven shaft is provided with an integral collar and the constraining means includes a bearing abutting said collar and in which the driven shaft rotates, and a pivoted link connected to said bearing and confining movement of said driven shaft substantially to uni-planar movement.

ARTHUR J. BRADFORD.

REFERENCES CITED

The following references are of record in the file of this patent:

UNITED STATES PATENTS

| Number | Name | Date |
|---|---|---|
| 1,850,755 | Kindelmann et al. | Mar. 22, 1932 |
| 1,654,800 | Garbutt | Jan. 3, 1928 |
| 1,398,680 | Clayton | Nov. 29, 1921 |
| 1,346,357 | Wenderhold | July 15, 1920 |
| 1,277,559 | Emory | Sept. 3, 1918 |
| 1,299,612 | Reney | Apr. 8, 1919 |

FOREIGN PATENTS

| Number | Country | Date |
|---|---|---|
| 758,927 | France | Nov. 7, 1933 |